United States Patent Office 3,354,108
Patented Nov. 21, 1967

3,354,108
GRAFT BLEND OF DIENE RUBBER POLYMERIC COMPOSITIONS HAVING IMPROVED TOUGHNESS
Leo P. Paradis, Wilbraham, and William J. Hall, North Wilbraham, Mass., assignors to Monsanto Company, St. Louis, Mo., a corporation of Delaware
No Drawing. Filed June 19, 1964, Ser. No. 376,552
7 Claims. (Cl. 260—31.4)

ABSTRACT OF THE DISCLOSURE

There are disclosed graft compositions exhibiting increased toughness which comprise an intimate mixture of (A) a graft blend of 5 to 40 parts by weight of a diene rubber and 95 to 60 parts by weight of a resinous interpolymer of a monovinylidene aromatic hydrocarbon and an unsaturated nitrile, and (B) about 0.2 to 10 percent based upon the weight of the blend of a polyethylene glycol compound. The graft blend is one in which at least a portion of the resinous interpolymer is prepared by polymerizing the resin-forming monomers in the presence of the diene rubber. The polyethylene glycol compound is selected from the group consisting of a polyethylene glycol having an average molecular weight between about 6500 and 20,000, and the $C_1$–$C_{20}$ alkyl ethers and the $C_1$–$C_{20}$ alkanoic esters thereof.

---

This invention relates to polymeric compositions having improved toughness and more particularly relates to certain diene rubber/monovinylidene aromatic hydrocarbon-unsaturated nitrile interpolymer blends containing an additive which improves the toughness of articles formed from the blends.

Among the valuable high impact strength compositions which have been developed during recent years are diene rubber/monovinylidene aromatic hydrocarbon-unsaturated nitrile interpolymer blends of the type wherein at least a portion of the interpolymer has been prepared by polymerizing the resin-forming monomers in the presence of the diene rubber. In such blends, as is well known, part of the resinous interpolymer component is in chemical combination with the diene rubber as polymer chains grafted onto a rubber backbone.

An object of the invention is to provide improved diene rubber/monovinylidene aromatic hydrocarbon-unsaturated nitrile interpolymer blends of the type wherein at least a portion of the interpolymer has been prepared by polymerizing the resin-forming monomers in the presence of the diene rubber.

Another object is to provide such blends having improved toughness.

A further object is to provide a means for improving the toughness of such blends.

These and other objects are attained by intimately mixing about 0.2–10 parts by weight of a polyethylene glycol having an average molecular weight of at least about 6500 or a $C_1$–$C_{20}$ alkyl ether or $C_1$–$C_{20}$ alkanoic ester thereof with 100 parts by weight of a diene rubber/monovinylidene aromatic hydrocarbon-unsaturated nitrile interpolymer blend of the type wherein at least a portion of the interpolymer has been prepared by polymerizing the resin-forming monomers in the presence of the diene rubber.

The following examples are given to illustrate the invention. Unless otherwise specified, quantities mentioned are quantities by weight, and tensile elongation at fail values are determined essentially in accordance with ASTM test D–638–61T on ¼" x ⅛" x 2¼" effective (4" overall) injection molded test specimens. For convenience, polyethylene glycols having average molecular weights of 7500, 20,000, etc., are designated as PEG 7500, PEG 20,000, etc.

Example I—(Control)

Prepare a graft copolymer latex by polymerizing 50 parts of an 80:20 mixture of styrene and acrylonitrile at 55° C. in an aqueous latex containing 100 parts of a cross-linked rubbery butadiene-styrene (90:10) copolymer having a swelling index of 11–20 in benzene so as to form a product in which at least 80% of the polymerized styrene-acrylonitrile is chemically-combined with the rubber substrate of the graft copolymer. Stabilize the graft copolymer latex and blend it with a latex containing 135 parts of a styrene-acrylonitrile (80:20) copolymer having a specific viscosity of about 0.07, measured as a solution of 0.1% of the polymer in dimethylformamide at 25° C. Co-coagulate the polymers from the mixed latices and recover the coagulum. Extrusion blend the coagulum at about 218° C. with about 270 parts of a styrene-acrylonitrile (72:28) bead copolymer having a specific viscosity of about 0.08, measured as a solution of 0.1% of the polymer in dimethylformamide at 25° C. An injection molded specimen of the blend has a tensile elongation at fail of 32%.

Example II

Repeat Example I except for extrusion blending about 11 parts of PEG 7500 with the polyblend while blending the coagulum and bead copolymer. An injection molded specimen of the blend has a tensile elongation at fail of about 150%.

Example III—(Control)

Prepare a graft copolymer latex by polymerizing 50 parts of an 80:20 mixture of styrene and acrylonitrile at 55° C. in an aqueous latex containing 100 parts of a cross-linked rubbery butadiene-styrene (90:10) copolymer having a swelling index of 11–20 in benzene so as to form a product in which at least 80% of the polymerized styrene-acrylonitrile is chemically-combined with the rubber substrate of the graft copolymer. Stabilize the graft copolymer latex and blend it with a latex containing 135 parts of a styrene-acrylonitrile (80:20) copolymer having a specific viscosity of about 0.07, measured as a solution of 0.1% of the polymer in dimethylformamide at 25° C. Co-coagulate the polymers from the mixed latices and recover the coagulum. Extrusion blend the coagulum at about 218° C. with about 585 parts of a styrene-acrylonitrile (72:28) bead copolymmer having a specific viscosity of about 0.08, measured as a solution of 0.1% of the polymer in dimethylformamide at 25° C. An injection molded specimen of the blend has a tensile elongation at fail of 19%.

Example IV

Repeat Example III except for extrusion blending about 21.8 parts of PEG 20,000 with the polyblend while blending the coagulum and bead copolymer. An injection molded specimen of the blend has a tensile elongation at fail of 84%.

Example V

Repeat Example III except for extrusion blending about 43.5 parts of PEG 20,000 with the polyblend while blending the coagulum and bead copolymer. An injection molded specimen of the blend has a tensile elongation at fail of 78%.

Example VI—(Control)

Prepare a graft copolymer latex by polymerizing 50 parts of an 80:20 mixture of styrene and acrylonitrile at 55° C. in an aqueous latex containing 100 parts of a cross-linked rubbery butadiene-styrene (90:10) copolymer having a swelling index of 11–20 in benzene so as to form a product in which at least 80% of the polymerized styrene-acrylonitrile is chemically-combined with the rubber substrate of the graft copolymer. Stabilize the graft copolymer latex and blend it with a latex containing 135 parts of a styrene-acrylonitrile (80:20) copolymer having a specific viscosity of about 0.07, measured as a solution of 0.1% of the polymer in dimethylformamide at 25° C. Co-coagulate the polymers from the mixed latices and recover the coagulum. Extrusion blend the coagulum at about 218° C. with about 1050 parts of a styrene-acrylonitrile (72:28) bead copolymer having a specific viscosity of about 0.08, measured as a solution of 0.1% of the polymer in dimethylformamide at 25° C. An extruded specimen of the blend has a tensile elongation at fail of 5%.

*Example VII*

Repeat Example VI except for extrusion blending about 6.7 parts of PEG 7500 with the polyblend while blending the coagulum and bead copolymer. An injection molded specimen of the blend has a tensile elongation at fail of 11%.

*Example VIII*

Repeat Example VI except for extrusion blending about 26.7 parts of PEG 7500 with the polyblend while blending the coagulum and bead copolymer. An extruded specimen of the blend has a tensile elongation at fail of 24%.

*Example IX*

Repeat Example VI except for extrusion blending about 6.7 parts of PEG 7500 and about 20 parts of PEG 20,000 with the polyblend while blending the coagulum and bead copolymer. An injection molded specimen of the blend has a tensile elongation at fail of 66%.

As demonstrated above, intimately mixing about 0.5–5%, based on the weight of the blend, of PEG 7500 and/or PEG 20,000 with a blend of a styrene-acrylonitrile superstrate/butadiene-styrene rubber substrate graft copolymer, an emulsion-polymerized styrene-acrylonitrile copolymer, and a styrene-acrylonitrile bead copolymer results in improving the toughness of the blend, as evidenced by the higher elongations at fail. The falling dart impact strengths of the blends are also improved. Similar results are observed when:

(1) 0.2–10% by weight of PEG 6500, PEG 9500, PEG 15,000, dibutoxy PEG 10,000, monolauroxy PEG 7500, PEG 7000 distearate, PEG 9500 monopalmitate, or PEG 20,000 diacetate is employed as the toughener, (2) The diene rubber/monovinylidene aromatic hydrocarbon-unsaturated nitrile interpolymer blend is the product obtained by dissolving 5 parts of a rubbery polybutadiene in 95 parts of a 60:40 mixture of styrene and acrylonitrile and mass polymerizing the monomers, (3) The diene rubber/monovinylidene aromatic hydrocarbon-unsaturated nitrile interpolymer blend is the product obtained by polymerizing 90 parts of a 70:20:10 mixture of styrene, methacrylonitrile, and dibutyl fumarate in an aqueous latex containing 10 parts of a cross-linked rubbery butadiene-styrene (95:5) copolymer and recovering the latex solids, and (4) The diene rubber/monovinylidene aromatic hydrocarbon-unsaturated nitrile interpolymer blend is the product obtained by (a) polymerizing 60 parts of a 40:30:30 mixture of styrene, alpha-methylstyrene, and acrylonitrile in an aqueous latex containing 100 parts of a rubbery butadiene-styrene-acrylonitrile (80:10:10) terpolymer, (b) blending the resultant graft copolymer latex with a latex containing 125 parts of a styrene-alpha-methylstyrene-acrylonitrile (40:30:30) terpolymer, and (c) co-coagulating the polymers from the mixed latices and recovering the coagulum.

The polyblends which are modified in accordance with the present invention are diene rubber/monovinylidene aromatic hydrocarbon-unsaturated nitrile interpolymer blends of the type wherein at least a portion of the interpolymer has been prepared by polymerizing the resin-forming monomers in the presence of the diene rubber. Such blends, as is already known, have greater or lesser amounts of the interpolymer chemically-combined with the diene rubber, depending on factors such as the proportion of the interpolymer prepared in the presence of the diene rubber, the polymerization technique (e.g., mass, suspension, mass-suspension, emulsion, or solution) employed, the polymerization conditions, etc. The blends with which the present invention is concerned contain 5–40% by weight of the diene rubber and, correspondingly, 95–60% by weight of the interpolymer.

DIENE RUBBER

The diene rubber component can be any diene rubber or mixture of diene rubbers, i.e., any rubbery polymer (a polymer having a second order transition temperature not higher than 0° C., preferably not higher than −20° C., as determined by ASTM test D–746–52T) of one or more conjugated 1,3-dienes, e.g., butadiene, isoprene, piperylene, chloroprene, etc. Such rubbers include homopolymers of conjugated 1,3-dienes, interpolymers of conjugated 1,3-dienes with one another, and interpolymers of one or more conjugated 1,3-dienes with up to an equal amount by weight of one or more copolymerizable monoethylenically-unsaturated monomers, such as monovinylidene aromatic hydrocarbons (e.g., styrene; an ar-alkylstyrene, such as the o-, m-, and p-methylstyrenes, 2,4-dimethylstyrene, the ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc.), ar-halo monovinylidene aromatic hydrocarbons (e.g., the o-, m-, and p-chlorostyrenes, 2,4-dibromostyrene, 2 - methyl - 4 - chlorostyrene, etc.), acrylonitrile, methacrylonitrile, alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.), unsaturated ketones (e.g., vinyl methyl ketone, methyl isopropenyl ketone, etc.), alpha-olefins (e.g., ethylene, propylene, etc.), vinyl pyridines, vinyl esters (e.g., vinyl acetate, vinyl stearate, etc.), vinyl and vinylidene halides (e.g., the vinyl and vinylidene chlorides and bromides, etc.), and the like.

The rubber can (and frequently does) also contain up to about 2%, advantageously 0.5–1.5%, of a cross-linking agent, based on the weight of the rubber-forming monomer or monomers. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

According to a preferred embodiment of the invention, the diene rubber is a rubber which has been prepared with proper regulation of the degree of conversion and/or of a cross-linking agent content to provide a rubber having a swelling index at least as high as 11, preferably 11–20, in benzene, as determined by (a) maintaining a mixture of 0.3 gram of the rubber and 75 ml. of benzene in total darkness for 24 hours at 20° C., (b) filtering the mixture through a 100 mesh stainless steel screen, (c) washing the benzene-insoluble portion of the rubber with 10 ml. of benzene and determining the weight of the insoluble, solvent-swollen polymer, (d) evaporating an aliquot of the filtrate to dryness to determine the weight of the benzene-soluble portion of the rubber, and (e) calculating the swelling index (i.e., the ratio of solvent-swollen gel to dry gel) in accordance with the equation:

Swelling index =

$$\frac{\text{Wt. in grams of benzene-swollen polymer}}{0.3 - \text{wt. in grams of benzene-soluble polymer}}$$

A preferred group of diene rubbers are those which consist essentially of 85–100% by weight of butadiene and/or isoprene and up to 15% by weight of a monovinylidene aromatic compound. Butadiene-styrene copolymers having a combined styrene content of 5–15% by weight are particularly preferred.

INTERPOLYMER

The monovinylidene aromatic hydrocarbon-unsaturated nitrile component of the blends is an interpolymer of a monovinylidene aromatic hydrocarbon (e.g., styrene; an ar-alkylstyrene, such as the o-, m-, and p-methylstyrenes, 2,4-dimethylstyrene, the ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc., and mixtures thereof) and an unsaturated nitrile of the group consisting of acrylonitrile, methacrylonitrile, and mixtures thereof.

These interpolymers may, if desired, contain up to about 20% by weight of one or more other copolymerizable ethylenically-unsaturated monomers, such as alkyl acrylates (e.g., methyl acrylate, ethyl acrylate, butyl acrylate, octyl acrylate, etc.), the corresponding alkyl methacrylates, unsaturated acids (e.g., acrylic acid, methacrylic acid, etc.), unsaturated amides (e.g., acrylamide, methacrylamide, N-butyl acrylamide, etc.), ar-halostyrenes (e.g., the o-, m-, and p-chlorostyrenes, p-bromostyrene, etc.), dialkyl maleates and fumarates (e.g., the dimethyl, diethyl, dibutyl, and dioctyl maleates and fumarates, etc.), conjugated dienes (e.g., butadiene, isoprene, etc.), and the like. Also, if desired, the interpolymers can contain minor amounts, e.g., about 0.05–5% by weight, of a chain transfer agent, such as a higher alkyl mercaptan, alpha-methylstyrene dimer, etc.

Among the preferred interpolymers are those which consist essentially of 20–95%, preferably 60–85%, by weight of a combined monovinylidene aromatic hydrocarbon and 80–5% preferably 40–15%, by weight of combined acrylonitrile and/or methacrylonitrile.

As mentioned above, the blends with which the present invention is concerned are those wherein at least a portion of the interpolymer has been prepared in the presence of the diene rubber to cause some chemical combination to occur between the rubber and interpolymer components. In describing such blends it has become customary to use the term "graft copolymer substrate" to designate the diene rubber component because of the large number of cases in which it has not been found possible to extract any of the diene rubber from the blends with the usual rubber solvents, although it is believed that some of the polymer chains of the rubber may not be in actual chemical combination with the interpolymer in some of the blends. "Graft copolymer superstrate" is the term used to designate that portion of the interpolymer which has been prepared in the presence of the diene rubber. At least a small amount of the superstrate is not in chemical combination with the substrate because of the less-than-100% grafting efficiency of conventional graft copolymerization reactions.

Any monovinylidene aromatic hydrocarbon-unsaturated nitrile interpolymer employed in addition to the graft copolymer superstrate usually has a specific viscosity of about 0.04–0.15, preferably about 0.07–0.1, measured as a solution of 0.1% of the polymer in dimethylformamide at 25° C. This additional interpolymer can have been prepared by any of the conventional mass, solution, emulsion, or suspension polymerization techniques and is blended with the graft copolymer in any suitable manner, e.g., by milling, extrusion blending, recovery from mixed latices by drum drying, spray drying, coagulating, etc.

A preferred embodiment of the invention is the modification of blends of (1) a monovinylidene aromatic hydrocarbon-unsaturated nitrile superstrate/diene rubber substrate graft copolymer containing 15–90 (preferably 30–70, and even more preferably 40–60) parts by weight of superstrate/100 parts by weight of substrate and having at least 80% of the superstrate chemically-combined with the substrate and (2) a separately-prepared monovinylidene aromatic hydrocarbon-unsaturated nitrile interpolymer in such proportions that the graft copolymer substrate constitutes 5–40% (preferably 15–35%) by weight of the blend. The blends can contain optional additives, e.g., lubricants, processing aids, colorants, etc., if desired.

TOUGHENING AGENT

The toughening agent of the invention is a polyethylene glycol compound of the group consisting of a polyethylene glycol having an average molecular weight of at least about 6500 and the $C_1$–$C_{20}$ alkyl ethers and $C_1$–$C_{20}$ alkanoic esters thereof. Exemplary of such compounds are PEG 6500, PEG 7000, PEG 7500, PEG 9500, PEG 10,000, PEG 15,000, PEG 20,000 and the mono- and dimethoxy, -butoxy, -lauroxy, -stearoxy, -acetate, -hexanoate, -laurate, -palmitate, and -stearate derivatives thereof, etc., and mixtures thereof. Polyethylene glycols having average molecular weights in the range of about 6500–20,000 are especially preferred.

The amount of polyethylene glycol compound employed should be in the range of about 0.2–10%, preferably about 0.5–5%, based on the weight of the blend. It can be intimately mixed with the blend in any suitable manner, advantageously by extrusion blending or mill rolling at temperatures of about 190–260° C.

As demonstrated in the examples, articles formed from the products of the invention have better toughness than articles formed from comparable blends which are not modified by admixture with a polyethylene glycol compound of the invention.

It is obvious that many variations can be made in the products and processes set forth above without departing from the spirit and scope of this invention.

What is claimed is:

1. A composition comprising an intimate mixture of (A) a graft blend of 5–40 parts by weight of a diene rubber and, correspondingly, 95–60 parts by weight of a resinous interpolymer of a monovinylidene aromatic hydrocarbon and an unsaturated nitrile of the group consisting of acrylonitrile, methacrylonitrile, and mixtures thereof, at least a portion of said resinous interpolymer having been prepared by polymerizing the resin-forming monomers in the presence of the diene rubber, and (B) about 0.2–10%, based on the weight of said blend, of a polyethylene glycol compound of the group consisting of a polyethylene glycol having an average molecular weight of between about 6500 and 20,000 and the $C_1$–$C_{20}$ alkyl ethers and $C_1$–$C_{20}$ alkanoic esters thereof.

2. The composition of claim 1 wherein the amount of polyethylene glycol compound is in the range of about 0.5–5%, based on the weight of the blend.

3. The composition of claim 1 wherein the blend consists of (A) a monovinylidene aromatic hydrocarbon-unsaturated nitrile superstrate/diene rubber substrate graft copolymer containing 15–90 parts by weight of superstrate/100 parts by weight of substrate and having at least 80% of the superstrate chemically-combined with the substrate and (B) a resinous monovinylidene aromatic hydrocarbon-unsaturated nitrile interpolymer.

4. A composition comprising an intimate mixture of (A) a graft blend of
   (1) a styrene-acrylonitrile superstrate/butadiene-styrene rubber substrate graft copolymer containing 15–90 parts by weight of superstrate/100 parts by weight of substrate and having at least 80% of the superstrate chemically-combined with the substrate; said superstrate consisting essentially of 60–85% by weight of combined styrene and 30–15% by weight of combined acrylonitrile; said substrate being a rubbery polymer of about 85–95% by weight of combined butadiene and about 15–5% by weight of combined styrene and being characterized by a swelling index of 11–20 in benzene, and (2) a styrene-acrylonitrile copolymer having a combined styrene content of about 60–85% by weight and a combined acrylonitrile content of about 40–15% by weight and having a specific viscosity of 0.04–0.15, measured as as a solution of 0.1% of the copolymer in dimethylformamide at 25° C., the components of said blend being combined in such proportions that the graft copolymer substrate constitutes 5–40% of the weight of the blend, and (B) about 0.05–5%, based on the weight of said blend, of a polyethylene glycol compound of the group consisting of a polyethylene glycol having an average molecular weight of between about 6500 and 20,000 and the $C_1$–$C_{20}$ alkyl ethers and $C_1$–$C_{20}$ alkanoic esters thereof.

5. A process for preparing the composition of claim 1 which comprises extrusion blending the blend and the polyethylene glycol compound at 190–260° C.

6. A process for producing a toughened graft blend which comprises intimately mixing (A) a graft blend of 5–40 parts by weight of a diene rubber and, correspondingly, 95–60 parts by weight of a resinous interpolymer of a monovinylidene aromatic hydrocarbon and an unsaturated nitrile of the group consisting of acrylonitrile, methacrylonitrile, and mixtures thereof, at least a portion of said resinous interpolymer having been prepared by polymerizing the resin-forming monomers in the presence of the diene rubber, and (B) about 0.2–10%, based on the weight of said blend, of a polyethylene glycol compound of the group consisting of a polyethylene glycol having an average molecular weight of between about 6500 and 20,000 and the $C_1$–$C_{20}$ alkyl ethers and $C_1$–$C_{20}$ alkanoic esters thereof.

7. The process of claim 6 wherein the amount of polyethylene glycol compound is in the range of about 0.5 to 5 percent, based upon the weight of the graft blend.

References Cited
UNITED STATES PATENTS

| | | | |
|---|---|---|---|
| 2,718,509 | 9/1955 | Lundsted | 260—33.2 |
| 2,802,808 | 8/1957 | Hayes | 260—880 |
| 2,957,843 | 10/1960 | Anderson | 260—33.2 |
| 3,188,165 | 6/1965 | Magat | 260—881 |
| 3,220,917 | 11/1965 | Lowes | 260—33.2 |
| 3,249,569 | 5/1966 | Fantl | 260—33.2 |

JULIUS FROME, *Primary Examiner.*